United States Patent [19]

Tanaka et al.

[11] 4,317,700

[45] Mar. 2, 1982

[54] METHOD OF FABRICATION OF PLANAR BUBBLE DOMAIN DEVICE STRUCTURES

[75] Inventors: Kunihide Tanaka, Irvine; Michael T. Elliott, Carbon Canyon; Sam Chung, Costa Mesa; James Pau, Irvine; Linda Gray, Fullerton; Liping D. Hou, Seal Beach; Mary F'Mayer, Garden Grove; David Warren, Fullerton; Karen Finch, Mission Viejo, all of Calif.

[73] Assignee: Rockwell International Corporation, El Segundo, Calif.

[21] Appl. No.: 179,843

[22] Filed: Aug. 20, 1980

[51] Int. Cl.[3] .......................... B44C 1/22; C03C 15/00; C03C 25/06

[52] U.S. Cl. .......................... 156/652; 156/656; 156/659.1; 156/661.1; 427/96; 427/125; 427/130; 427/131; 427/132

[58] Field of Search .......................... 427/130, 131-132, 427/96, 125; 156/652, 659.1, 661.1, 656

[56] References Cited

U.S. PATENT DOCUMENTS

| | | | |
|---|---|---|---|
| 4,170,471 | 10/1979 | Bailey et al. | 75/173 C |
| 4,172,758 | 10/1979 | Bailey et al. | 427/131 X |

*Primary Examiner*—Bernard D. Pianalto

*Attorney, Agent, or Firm*—H. Fredrick Hamann; Daniel R. McGlynn

[57] ABSTRACT

A method of fabricating a bubble domain device composite structure on a substrate of depositing a barrier layer of a suitable polymeric dielectric material on the substrate; subsequently depositing a layer of electrically conductive material thereover; subsequently depositing a spacer layer of a liquid polymeric dielectric material over the conductive layer;.processing the spacer layer so that the surface of the spacer layer is substantially planar; and subsequently depositing a layer of a magnetically operative material over the spacer layer.

14 Claims, 13 Drawing Figures

METHOD OF FABRICATION OF PLANAR BUBBLE DOMAIN DEVICE STRUCTURES

FIELD OF THE INVENTION

The invention relates to a method of fabrication for microelectronic device structures, and in particular to a method of fabricating magnetic bubble domain devices.

BACKGROUND OF THE INVENTION

Various methods of planar or non-planar techniques of fabrication of bubble domain device structures are known in the prior art. U.S. Pat. No. 4,172,758 of R. F. Bailey et al describes one basic fabrication technique for producing a magnetic bubble domain device. The co-pending U.S. patent application, Ser. No. 242,078, filed Mar. 9, 1981, and assigned to the common assignee, describes a planar method of device fabrication using a glass deposited by either sputtering or evaporation as the spacer layer between metal layers of the device. The drawback of such a configuration is that the Permalloy film can never be deposited without having a sharp non-planar component due to the troughs created during the lift-off step.

There are also a number of non-planar fabrication techniques in which various layers of materials are placed sequentially upon the original substrate, the layers generally following the contours of the preceeding layers. The disadvantage with such non-planar techniques is that in a multi-level device structure or composite, certain regions such as crossover areas, corners, and the like are subject to failure modes such as cracks, discontinuities, or other defects. In addition, reduced device behavior results from the interaction between non-planar Permalloy films and the magnetic "bubble" domains.

The disadvantages associated with the known planar or non-planar fabrication techniques make them impractical for implementation in devices in which smaller and smaller device structures are utilized, making greater demands upon the fabrication techniques. Prior to their present invention there has not been a satisfactory method of fabrication of bubble domain device structures capable of supporting a high density of magnetic bubble domains on the device.

SUMMARY OF THE INVENTION

Briefly, and in general terms, the present invention provides a method of fabricating a bubble domain device structure, including the steps of depositing a barrier layer of a suitable polymeric dielectric material on the substrate; subsequently depositing a layer of electrically conductable material thereover; subsequently depositing a spacer layer of a liquid polymeric dielectric material over the conductive layer; processing the spacer layer so that the surface of the spacer layer is substantially planar; and subsequently depositing a layer of a magnetically operative material over the spacer layer.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF A PREFERRED EMBODIMENT

Figure 1A:
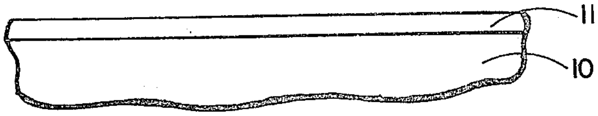
FIGS. 1*a* through 1*g* are cross-sectional views of the composite of the instant invention during the processing thereof, according to the planar process according to the present invention.

Referring now to FIG. 1*a*, there is shown a cross-sectional view of a composite which is formed during the process involved in the instant invention.

A suitable substrate 10 is provided. Substrate 10 may be of any suitable material such as a semiconductor and the like. For purposes of this explanation, substrate 10 may be considered to be a magnetic bubble domain supporting material such as a suitable garnet. The garnet substrate together with a thin epitaxial layer of magnetic bubble domain material may be of any suitable thickness such as ~20 mils. Deposited on a surface of substrate 10 is a barrier layer 11 of a suitable dielectric isolation material. The barrier layer 11 is preferably composed of suitable glass or polyimide, which is applied to form a layer having a typical thickness on the order of 300 to 5000 Angstroms. The barrier layer 11 may be deposited by evaporation, in the case of a suitable glass, or spun-on, in the case of polyimide. Of course, any suitable technique for forming barrier layer 11 on the surface of substrate 10 is also within the scope of the present invention.

Figure 1B:
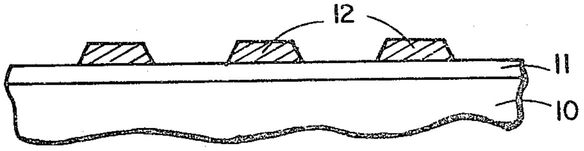

Referring next to FIG. 1*b*, a conductor layer 12 is applied over the isolation layer and patterned into a series of discrete tracks or elements.

The layer 12 is provided on layer 11 in any suitable fashion such as evaporation, electrodeposition or the like. Layer 12 typically has a thickness of 1000 to 6000 Angstroms, and is formed of any suitable material which is conductive, both thermally and electrically. The type of material is a function of the characteristics required by the bubble device. Typically, layer 12 may be copper-doped-aluminum, or indium-doped-silver as disclosed in U.S. Pat. No. 4,170,471 entitled Metal Alloys for Magnetic Bubble Domain Devices, by R. F. Bailey, and assigned to the common assignee. Of course any other suitable or desirable conductive material can be utilized. The layer 12 is patterned into strips or other elements (such as the three blocks shown in the Figure) according to techniques known in the art.

FIG. 1*b* shows the composite of the present invention after a deposition of a suitable conductor layer 12 and patterning into discrete conductor elements 12. The conductor is typically composed of aluminum copper and may be applied by any suitable technique, preferably either evaporation or sputtering. The conductor layer is patterned by means of the application of a resist, followed by subsequent exposure, development and removal of excess material according to techniques known in the art. The removal of the excess material preferably takes place by ion milling, as is taught in U.S. Pat. No. 4,172,758.

A suitable adhesion promoter is now applied to the top surface of the conductors 12 and the barrier layer 11 to promote adhesion of subsequent layers thereto. The adhesion layer is not shown in FIG. 1*b* to avoid complicating the drawing.

Figure 1C:
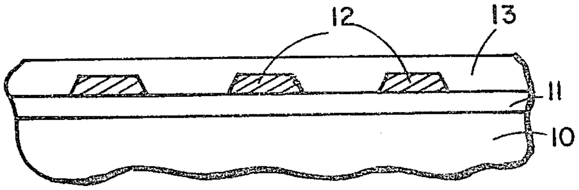

Referring next to FIG. 1*c*, a further spacer layer 13, which is substantially similar to barrier layer 11, is provided on the surface of the patterned conductor layer 12 and barrier layer 11. The layer 13 is preferably a liquid polyimide, and is applied to the composite, preferably by spinning on. In order to achieve a high degree of planarity and appropriate uniformity of the film, a spin-on speed of approximately 6,000 rmp, with a relatively high ramp-up speed, is used. Following application by spin on, the polyimide layer 13 is baked. Although a wide variety of polyimide compositions may be used for the layer 13, the Dupoont film Pyralin is preferred.

A masking layer (not shown) is then provided on the upper surface of spacer layer 13. The masking layer may be of any suitable type of material such as photoresist type AZ1470J manufactured by Shipley. The thickness of masking layer is determined by the processes to be used but in the process defined herein and with the dimensions and materials noted, layer may have a thickness of 0.5 to 2.0 microns. The masking layer is then treated in the appropriate manner for establishing a mask layer. For example, layer may be exposed and developed by ultraviolet light and other known techniques. The masking layer is treated in any suitable manner which permits processing by any known etching technique, including chemical etching or ion milling or other dry etching techniques.

Figure 1D:
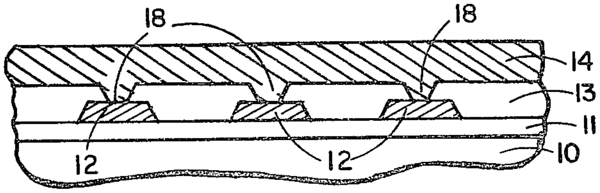

After the masking layer has been properly treated, and the appropriate pattern is defined, etching or ion milling processes are undertaken and the pattern which has been delineated by the mask is transcribed wherein portions of the spacer layer 13 are removed completely through to conductor layer 12 as shown in FIG. 1*d*. By using ion milling techniques and with the appropriate thicknesses of the materials, substantially good wall definition is produced.

Referring again to FIG. 1*d*, the fully etched composite described above is next provided with a layer 14 of nickel-iron or the like is provided over the surface of the entire layer 13. Layer 14 can be on the order of 2500–5000 Angstroms and can also be sputtered or deposited by any suitable technique. Suitable patterns can be produced in layer 14 by applying, exposing developing, baking and otherwise utilizing a photoresist mask to provide a pattern which is produced in layer 14 by ion milling or chemical etching. The photoresist is then stripped and a suitable sequence of layers 15, 16, and 17 can be deposited. The layers 15, 16, and 17 can be on the order of 1000 to 30,000 Angstroms thick and can be provided by any suitable process.

In the present example, the mask provides a pattern so that cavities 18 are opened in the spacer layer 13 so that subsequently deposited conductive layers can make electrical contact with the conductors 12. As shown in FIG. 1*d*, cavities 18 are created which extend down to the surface of the conductors 12.

Following the etching and stripping of the resist and creation of the cavities 18, a layer 14 composed preferably of nickel-iron or Permalloy is deposited by means of sputtering, or other technique known in the art. The nickel-iron layer 14 makes physical and electrical contact with the conductors. The layer 14 preferably has a thickness of the order of 2500–5000 Angstroms.

Figure 1E:
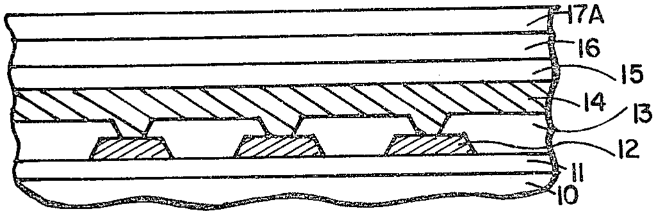

Turning next to FIG. 1*e*, there is shown the composite after layers 15, 16, and 17A have been applied. Following the deposition of the nickel-iron layer 14, a titanium-tungsten layer 15 having a thickness of about 1000 Angstroms is deposited by sputtering. The deposition of the titanium-tungsten layer 15 is followed by deposition of a gold layer 16 by means of electroplating, sputtering, or other suitable technique. Following the deposition of the gold layer, a resist layer 17A is applied.

A pattern mask is then placed over the gold layer. The resist layer 17A is then exposed, the image is developed and the gold and titanium tungsten layers are etched down to the nickel-iron layer 14 to form a predetermined pattern. The remaining portions of the top resist layer 17A are then stripped.

Figure 1F:
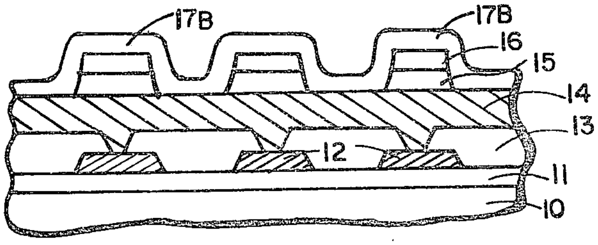

Turning next to FIG. 1*f*, there is shown the deposition of a second layer of photoresist **17*b* over the composite. The layer of photoresist 17*b* overlies the top surface of the gold layer 16 as well as the exposed portions of the nickel-iron layer 14. A mask is then provided which is used to specify those portions of the nickel-iron layer 14 which are to be removed by subsequent etching, and thereby also those portions of the nickel-iron layer 14 which are to remain as magnetically operative elements in the final magnetic bubble domain device. Suitable patterns of magnetically operative elements are thus provided by means of suitable masking, exposure of the photoresist, development of the photoresist, as is known in the art. The nickel-iron layer 14 is then etched in those portions specified by the photoresist mask leaving portions of the nickel-iron layer 14 such as 14*a*** shown in FIG. 1*g* which acts as the magnetically operative elements of a magnetic bubble domain device.

Figure 1G:
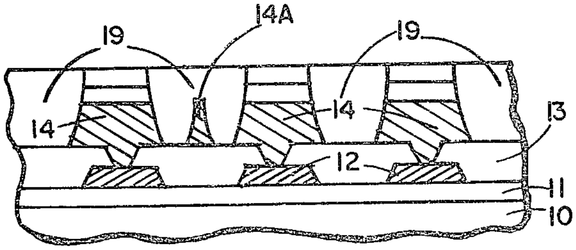

Turning next to FIG. 1*g*, there is shown the composite after the formation of the magnetically operative elements **14*a*. The cavities between the pads formed by the mesostructures 14 and the magnetically operative elements 14*a* are then filled with a passivating dielectric 19. In the preferred embodiment, according to the present invention, the passivating substance 19** is a liquid polymeric dielectric material.

FIGS. 2*a*–2*f* show a process sequence of the formation of a composite for producing a double conductor layer in a magnetic bubble domain device according to a process as taught by the present invention.

Figure 2A:
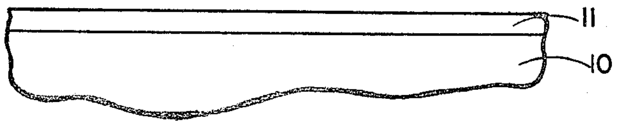
FIGS. 2*a* through 2*f* are cross-sectional views of the composite of the instant invention during processing thereof showing fabrication of a two-level conductor.
Figure 2B:
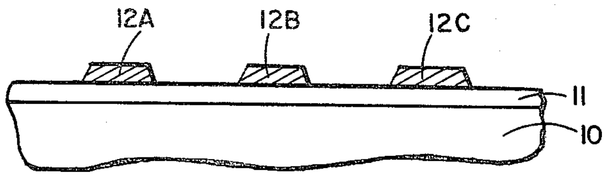
Figure 2C:
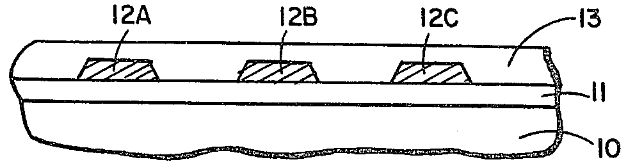

The process sequence shown in FIGS. 2*a*–2*c* is substantially identical to that described above.

FIG. 2*a* shows the deposition of a barrier layer 11 on the magnetic film or substrate 10 according to means known in the art. The barrier layer 11 is composed of a suitable dielectric material and may be applied by either evaporation or sputtering, or by spin-on.

FIG. 2*b* shows the composite of the present invention after a deposition of a suitable conductor layer 12 and patterning into discrete conductor elements **12*a*, 12*b* and 12*c***. The conductor is typically composed of aluminum copper and may be applied by any suitable technique, e.g., either evaporation or sputtering. The conductor layer is patterned by means of application of resist, exposure, development and removal of excess material according to techniques known in the art. The removal of the excess material preferably takes place by ion milling, as is taught in U.S. Pat. No. 4,172,758.

The resist is then removed by plasma stripping.

A suitable adhesion promoter is now applied to the top surface of the conductors 12, **12*b*, and 12*c* and the barrier layer 11** to promote adhesion of subsequent layers thereto. The adhesion layer is not shown in FIG. 2*b* to avoid complicating the drawing.

Turning now to FIG. 2*c*, a liquid polyimide layer 13 is applied to the composite, preferably by spinning on.

In order to achieve a high degree of planarity and appropriate uniformity, the spin on speed is approximately 6,000 rpm with a relatively high ramp up speed. Following application by spin on, the polyimide is baked. Though a wide variety of polyimide films may be used, the Dupont film Pyralin is preferred.

Figure 2D:
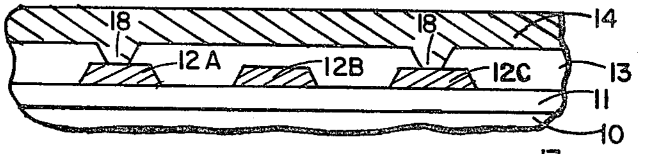
Figure 2E:
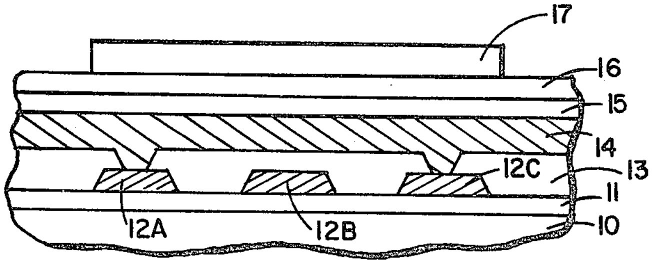

A resist is then applied, exposed to a predetermined pattern and etched, followed by stripping of the resist, according to techniques known in the art. In the present example in which we desire to create a two layer conductor, the mask pattern is arranged so that the layer of resist after stripping covers the conductors 12*a* and 12*c* but does not cover the conductor 12*b*. Thus following the removal of the resist and subsequent etching as shown in FIG. 2*d*, cavities 18 are created which extend through the spacer layer 13 down to the surface of the conductor 12*a* and 12*c*. The conductor 12*b*, however, is still isolated by the polyimide layer 13.

Following the etching and stripping of the resist, nickel-iron is deposited by means of sputtering, or other technique known in the art. The nickel-iron layer 14 has a thickness of 2500–5000 Angstroms and makes physical and electrical contact with the conductor pads 12*a* and 12*c*, but does not make a contact with the conductor pad 12*b* due to the isolation of pad 12*b*.

Following the deposition of the nickel-iron layer, a titanium-tungsten layer 15 having a thickness of about 1000 Angstroms is deposited by sputtering, which is followed by deposition of a gold layer 16 by means of electroplating, sputtering, or other suitable technique. Following the deposition of the gold layer, resist layer 17 is applied, and a pattern mask is placed over the gold layer. The resist layer is exposed, the image is developed and the gold is etched to form a predetermined pattern. Following the gold etch, the titanium-tungsten is etched, the resist is stripped, and the resulting structure is shown in FIG. 2*f*.

Figure 2F:
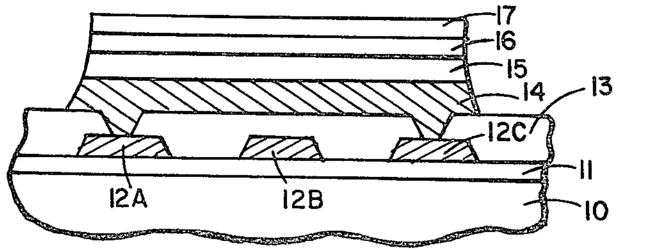

Referring now to FIG. 2*f*, there is shown a two layer conductor structure, the first layer being formed by conductor 12*b* and the second layer of conductor formed by the conductor 12*a* and 12*c* which are electrically connected by the layer 14 of nickel-iron. The processing of the composite structure shown in FIG. 2*f* is similar to that in FIG. 1 and therefore need not be repeated at this point.

While the invention has been illustrated and described as embodied in a method of fabrication of planar bubble domain device structures, it is not intended to be limited to the details shown, since various modifications and structural changes may be made without departing in any way from the spirit of the present invention.

It will be obvious to those skilled in the art that the magnetic bubble device according to the present invention can be manufactured with various lithographic technologies and different combinations of known process steps, and that the preferred embodiments illustrated here are merely exemplary. The composition, architecture and geometric configuration of the guide elements, and the layout and distance between the propagation paths, as well as the distance to the magnetic bubble guide elements, as well as their distance to the magnetic bubble layer, can be chosen depending upon the desired properties. These and other variations can be further elaborated by those skilled in the art without departing from the scope of the present invention.

The present invention is also not restricted to the specific magnetic materials and circuits described. For example, it may be pointed out that magnetic materials other than garnet, for example, hexagonal ferrites or various crystalline compounds may be used. Moreover, the source, orientation, and frequency of the magnetic field, and the static or dynamic nature of the signals applied to the device may be suitably selected as desired for a particular application.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. A method of fabricating a bubble domain device composite structure on a substrate comprising the steps of:

providing a layer capable of supporting magnetic bubble domains on said substrate;

depositing a barrier layer of a suitable polymeric dielectric material on said layer;

subsequently depositing a layer of electrically conductive material over said barrier layer;

subsequently depositing a spacer layer of a polymeric dielectric material in a liquid state over said conductive layer;

processing said spacer layer to a solid state so that the surface of the spacer layer is substantially planar; and subsequently depositing a layer of a magnetically operative material over the spacer layer.

2. A method as defined in claim 1, wherein said step of depositing a barrier layer comprises spinning on said dielectric material on said substrate.

3. A method as defined in claim 1, wherein said step of processing said spacer layer comprises spinning on said dielectric material, and subsequently baking it.

4. A method as defined in claim 1, wherein said layer of a magnetically operative material comprises nickel-iron.

5. A method as defined in claim 1, further comprising the step of depositing a titanium tungsten layer over said layer of a magnetically operative material.

6. A method as defined in claim 5, further comprising the step of depositing a layer of gold over said layer of titanium tungsten.

7. A method as defined in claim 6, further comprising the step of further depositing a first layer of photoresist over said gold layer.

8. A method as defined in claim 7, further comprising the step of masking and etching said photoresist layer to form a pattern of contact pads on said bubble domain device composite structure.

9. A method as defined in claim 8, further comprising the step of subsequently selectively etching portions of said gold layer and corresponding portions of said titanium-tungsten layer.

10. A method as defined in claim 9, further comprising the step of subsequently stripping the remaining portions of said first layer of photoresist.

11. A method as defined in claim 10, further comprising the step of subsequently applying a second layer of photoresist over said gold layer and the exposed portion of said layer of magnetically operative material.

12. A method as defined in claim 11, further comprising the step of masking and etching said second photoresist layer, and subsequently selectively etching portions of said layer of a magnetically operative material to form isolated elements of magnetically operative material.

13. A method as defined in claim 1, wherein said step of depositing a layer of electrically conductive material comprises forming discrete spaced-apart islands of electrically conductive material.

14. A method as defined in claim 13, wherein said step of depositing a layer of a magnetically operative material comprises depositing said layer so as to make physical and electrical contact with selected ones of said discrete spaced-apart islands of electrically conductive material.

* * * * *